US012706849B2

(12) United States Patent
Baruah et al.

(10) Patent No.: US 12,706,849 B2
(45) Date of Patent: Aug. 11, 2026

(54) ROUTABLE AND INTENT-BASED SERVICE CHAINS

(71) Applicant: Cisco Technology, Inc., San Jose, CA (US)

(72) Inventors: Pritam Baruah, Fremont, CA (US); Amjad Inamdar, Karnataka (IN); Laxmikantha Reddy Ponnuru, San Ramon, CA (US); Samir D Thoria, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 18/356,853

(22) Filed: Jul. 21, 2023

(65) Prior Publication Data

US 2024/0348549 A1 Oct. 17, 2024

(30) Foreign Application Priority Data

Apr. 11, 2023 (IN) ............................. 202341026925

(51) Int. Cl.
*H04L 47/2408* (2022.01)
*H04L 45/24* (2022.01)

(52) U.S. Cl.
CPC .......... *H04L 47/2408* (2013.01); *H04L 45/24* (2013.01)

(58) Field of Classification Search
CPC ......... H04L 45/38; H04L 45/12; H04L 45/24; H04L 47/2408; H04L 45/14; H04L 69/22; H04L 45/00; H04L 49/25; H04L 49/70; H04L 61/2592; H04L 67/63; H04L 45/76; H04L 47/24; H04L 47/2441
See application file for complete search history.

(56) References Cited

U.S. PATENT DOCUMENTS

| | | | | |
|---|---|---|---|---|
| 10,530,632 | B1 * | 1/2020 | Mukhopadhyaya | H04L 43/08 |
| 2012/0204219 | A1 | 8/2012 | Kopti | |
| 2013/0163594 | A1 * | 6/2013 | Sharma | H04L 45/66 370/392 |
| 2015/0071285 | A1 | 3/2015 | Kumar et al. | |
| 2016/0164776 | A1 * | 6/2016 | Biancaniello | H04L 45/306 370/392 |

(Continued)

OTHER PUBLICATIONS

International Search Report and Written Opinion for International Application No. PCT/US2024/024150, mailed Aug. 7, 2024, 11 Pages.

*Primary Examiner* — Tonia L Dollinger
*Assistant Examiner* — Linh T. Nguyen
(74) *Attorney, Agent, or Firm* — Polsinelli P.C.

(57) ABSTRACT

The present disclosure is directed to making service-chains routable and intent-based within an enterprise network. In one aspect, a method for simplifying steering of network traffic includes receiving an intent-based description of one or more services to be applied to the network traffic; defining a type for a service chain that includes the one or more services based on the intent-based description, the type serving as an address for the service chain for routing the network traffic to and from the one or more service included in the service chain; implementing the service chain at one or more network hubs; and implementing a traffic steering policy in the network for steering the network traffic to the one or more network hubs to be serviced by the one or more services.

17 Claims, 6 Drawing Sheets

(56) References Cited

U.S. PATENT DOCUMENTS

| | | | | |
|---|---|---|---|---|
| 2016/0165014 | A1* | 6/2016 | Nainar | H04L 45/04 370/392 |
| 2016/0344565 | A1 | 11/2016 | Batz et al. | |
| 2016/0344803 | A1* | 11/2016 | Batz | H04M 15/66 |
| 2016/0381175 | A1* | 12/2016 | Wu | H04L 45/64 709/240 |
| 2017/0019335 | A1 | 1/2017 | Schultz et al. | |
| 2017/0250869 | A1* | 8/2017 | Voellmy | H04L 43/14 |
| 2017/0310611 | A1 | 10/2017 | Kumar et al. | |
| 2018/0102919 | A1* | 4/2018 | Hao | H04L 45/38 |
| 2018/0191679 | A1* | 7/2018 | Mulka | H04L 47/2483 |
| 2019/0379635 | A1* | 12/2019 | Sundararajan | H04L 41/0894 |
| 2020/0099589 | A1 | 3/2020 | Sethi et al. | |
| 2020/0272501 | A1 | 8/2020 | Chalvadi et al. | |
| 2021/0306393 | A1 | 9/2021 | Muniyappa et al. | |
| 2022/0070081 | A1* | 3/2022 | Sivakumar | H04L 45/0377 |
| 2022/0078113 | A1 | 3/2022 | Rosen et al. | |
| 2022/0286392 | A1* | 9/2022 | Rangel Augusto | H04L 45/74 |
| 2022/0303364 | A1* | 9/2022 | Nandakumaran | H04L 69/08 |
| 2023/0412488 | A1* | 12/2023 | Kumar Mishra | G06N 3/044 |
| 2024/0015590 | A1* | 1/2024 | Shekhar | H04W 28/086 |
| 2024/0137312 | A1* | 4/2024 | Zhu | H04L 45/247 |
| 2024/0177710 | A1* | 5/2024 | Kumar Saha | G10L 15/1822 |

* cited by examiner

ROUTABLE AND INTENT-BASED SERVICE CHAINS

CROSS-REFERENCE TO RELATED APPLICATIONS

This application claims the benefit of Indian Provisional Application No. 2023-41026925 filed on Apr. 11, 2023, which is expressly incorporated by reference herein in its entirety.

TECHNICAL FIELD

The present technology pertains to service chaining and, more specifically, to providing routable and intent-based definition for one or more services in a service chain to be applied to relevant network traffic as the network traffic traverses through a network.

BACKGROUND

Service chaining allows network operators to steer traffic through various services, such as firewalls, WAN optimizers, and Intrusion Detection Systems (IDSs), among others, which together enforce specific policies and provide a desired functionality for the traffic. The services in a service chain can be "chained" together in a particular sequence along the path of the traffic to process the traffic through the sequence of services. For example, a network operator may define a service chain (SC) including a firewall and a WAN optimizer for traffic associated with an application. When such traffic is received, it is first routed to the firewall in the service chain, which provides firewall capabilities such as deep packet inspection and access control. After the traffic is processed by the firewall, it is routed to the WAN optimizer in the service chain, which can compress the traffic, apply quality-of-service (QOS) policies, or perform other traffic optimization functionalities. Once the traffic is processed by the WAN optimizer, it is routed towards its intended destination.

To implement a service chain, the network operator can program rules or policies for redirecting an application's traffic through a sequence of services in the service chain. For example, the network provider can program an access control list (ACL) in the network device's hardware, such as the network device's Ternary Content Addressable Memory (TCAM). The ACL can include entries which together specify the sequence of services in the service chain for the application's traffic. The ACL entries can identify specific addresses associated with the application's traffic, such as origin or destination IP addresses associated with the application's traffic, which the network device can use to match an ACL entry to traffic. The network device can then use the ACL entries to route the application's traffic through the sequence of services in the service chain.

Service instances within an SC may be in arbitrary geographies and location types (public clouds, Customer Premise Equipment (CPEs), data centers, etc.) and connected to the enterprise network in disparate ways. This leads to complex end-to-end networking and traffic steering, that can be extremely complicated to manage.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
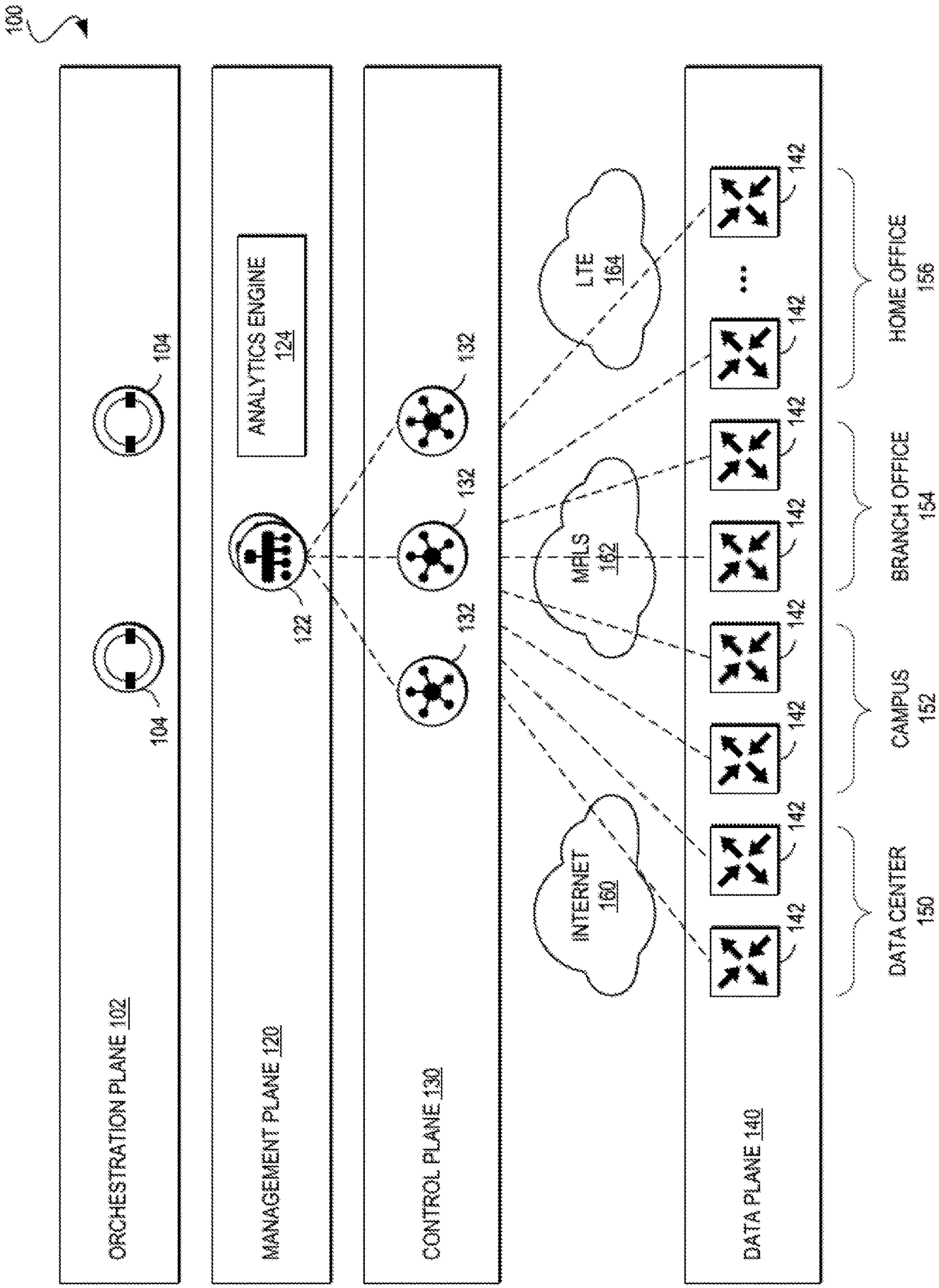
FIG. 1 illustrates an example of a high-level network architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to making service-chains routable and intent-based within an enterprise network. In other words, making service-chains routable is analogous to treating a service chain as an IP address, hence simplifying end-to-end networking and traffic routing for subjecting data packets to one or more relevant services in a SC.

In one aspect, a method for simplifying steering of network traffic includes receiving an intent-based description of one or more services to be applied to the network traffic; defining a type for a service chain that includes the one or more services based on the intent-based description, the type serving as an address for the service chain for routing the network traffic to and from the one or more service included in the service chain; implementing the service chain at one or more network hubs; and implementing a traffic steering policy in the network for steering the network traffic to the one or more network hubs to be serviced by the one or more services.

In another aspect, the type is selected from a group of service chain types.

In another aspect, the intent-based description identifies the one or more network hubs, and implementing the service chain includes instantiating the service chain at each of the one or more network hubs.

In another aspect, instantiating the service chain includes generating a configuration for the service chain; and downloading the configuration at each of the one or more network hubs.

In another aspect, implementing the traffic steering policy includes generating the traffic steering policy; and sending the traffic steering policy to one or more network routers for steering the network traffic (1) to the one or more network hubs; and (2) to one or more intended destination after the network traffic is serviced by the one or more services.

In another aspect, the service chain is implemented at at least two network hubs, and the network traffic is steered to one of the two network hubs based on Equal Cost Multi-Path (ECMP) routing.

In another aspect, the one or more services include at least one of a firewall service, an intrusion detection system service, and a flow analyzer service.

In one aspect, a network controller includes one or more memories having computer-readable instructions stored therein; and one or more processors. The one or more processors are configured to execute the computer-readable instructions to receive an intent-based description of one or more services to be applied to network traffic; define a type for a service chain that includes the one or more services based on the intent-based description, the type serving as an address for the service chain for routing the network traffic to and from the one or more service included in the service chain; implement the service chain at one or more network hubs; and implement a traffic steering policy in the network for steering the network traffic to the one or more network hubs to be serviced by the one or more services.

In one aspect, one or more non-transitory computer-readable media include computer-readable instructions, which when executed by one or more processors of a network controller, cause the network controller to receive an intent-based description of one or more services to be applied to network traffic; define a type for a service chain that includes the one or more services based on the intent-based description, the type serving as an address for the service chain for routing the network traffic to and from the one or more service included in the service chain; implement the service chain at one or more network hubs; and implement a traffic steering policy in the network for steering the network traffic to the one or more network hubs to be serviced by the one or more services.

EXAMPLE EMBODIMENTS

The disclosed technology addresses the need in the art for reducing the complexities associated with accessing dispersed service instances in a service chain.

As alluded to above, A SC is a set of services applied to a packet in a defined sequence, and inserted somewhere in the path across the network to the packet's destination. The device in which an SC is inserted is called a Service Chain Hub (hereafter: "SC-HUB"). SCs have an inherent structure to them, in that, packets can traverse through the services and back to the SC-HUB in a defined path. Furthermore, service instances within an SC might be in arbitrary geographies and location types (public clouds, CPEs, data centers, etc.) and connected to the enterprise network in disparate ways. This leads to complex end-to-end networking and traffic steering, that can be extremely complicated to manage.

Furthermore, services within a SC are conceptually independent entities, so network administrators get pre-occupied by the individual service instances and their networking in every location rather than treating the set of services by the inherently abstract nature of the user's ultimate intent.

Example embodiments proposed herein solve these problems by making service-chains routable and intent-based within an enterprise network. In other words, making service-chains routable is analogous to treating a service chain as an IP address, hence simplifying end-to-end networking and traffic routing for subjecting data packets to one or more relevant services in a SC.

A user's intent in applying one or more services in a SC to a particular network traffic can be expressed as, for example, "Apply Firewall & Flow Analyzer to all traffic to and from all restricted sites," "Apply Firewall & Intrusion Detection System to all traffic to and from enterprise workloads in AWS. For branches in Texas, these workloads are reachable through hub sites in Dallas & Austin," etc.

As will be described in more detail below, the present disclosure allows a user to create an abstract type to express an SC (e.g., one of the above examples of intent-based expression of a SC). The expressed 'type' may then be instantiated in any number of sites (locations) that can span geographies and location types.

With regard to the example intent-based expression of SCs above, an SC type may be defined as "Apply Firewall & Flow Analyzer." This SC type can then be instantiated in all sites (or one site, two or more sites, etc.) that have reachability to restricted sites. For the second example, an SC type may be defied as "Apply Firewall & Intrusion Detection System," that can be instantiated in Dallas & Austin.

The disclosure begins with a description of example network architectures for a software-defined network (e.g., SD-WAN) in which SC may be used for servicing various network traffic. An example of a SC configuration will then be described with reference to FIG. 2. Examples of routable and intent-based SCs will then be described with reference to FIGS. 3-6.

FIG. 1 illustrates an example of a high-level network architecture according to some aspects of the present disclosure. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122, using analytics engine 124, can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. Analytics engine 124 can collect and provide various analytics on operation of network 100 and any components thereof. Output of analytics engine 124 can then be used by network appliance(s) 122 to automatically monitor, configure and/or maintain operations of network 100 and/or enable a user to do the same. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
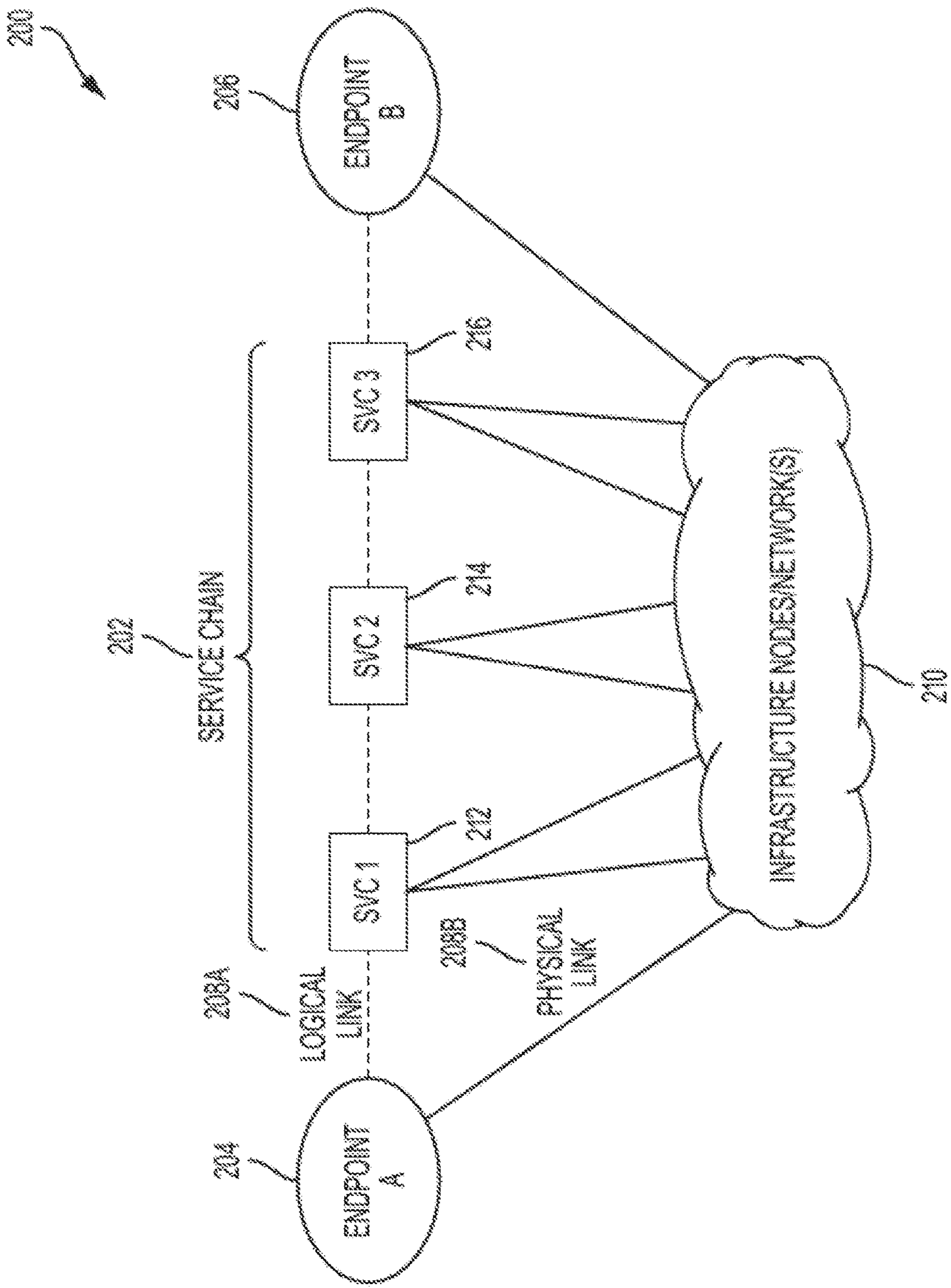
FIG. 2 illustrates a block diagram of an example service chain configuration for application traffic according to some aspects of the present disclosure.

FIG. 2 illustrates a block diagram of an example service chain configuration for application traffic according to some aspects of the present disclosure. In example configuration 200, a service chain 202 is configured to process traffic between endpoint 204 and endpoint 206. Endpoint 204 can include any device or server (physical and/or virtual) on a network, such as a cloud consumer network (e.g., a private cloud or on-premises site), and endpoint 206 can include any device or server (physical and/or virtual) on a different network, such as a public cloud. For example, endpoint 204 can be an application or server on a private cloud and endpoint 206 can be an application or server on a public cloud.

Service chain 202 includes service applications 212, 214, 216, which may be configured to apply specific L4 (Layer 4) through L7 (Layer 7) policies to traffic between endpoint 204 and endpoint 206. Service applications 212, 214, 216 can be implemented via respective virtual machines (VMs), software containers, servers, nodes, clusters of nodes, data centers, etc. Example service applications (212, 214, 216) include, without limitations, firewalls, Intrusion Detection Systems (IDS), Intrusion Detection Systems (IDS), WAN Optimizers, Network Address Translation (NAT) systems, virtual routers/switches, load balancers, Virtual Private Network (VPN) gateways, data loss prevention (DLP) systems, web application firewalls (WAFs), application delivery controllers (ADCs), packet capture appliances, secure sockets layer (SSL) appliances, adaptive security appliances (ASAs), etc.

Service applications 212, 214, 216 in service chain 202 are interconnected via a logical link 208A, which is supported by a physical link 208B through physical infrastructure 210. Physical infrastructure 210 can include one or more networks, nodes, data centers, clouds, hardware resources, physical locations, etc. Traffic from endpoint 204 can be routed to physical infrastructure 210 through physical link 208B, and redirected by physical infrastructure 210 along logical link 208A and through service chain 202.

Figure 3:
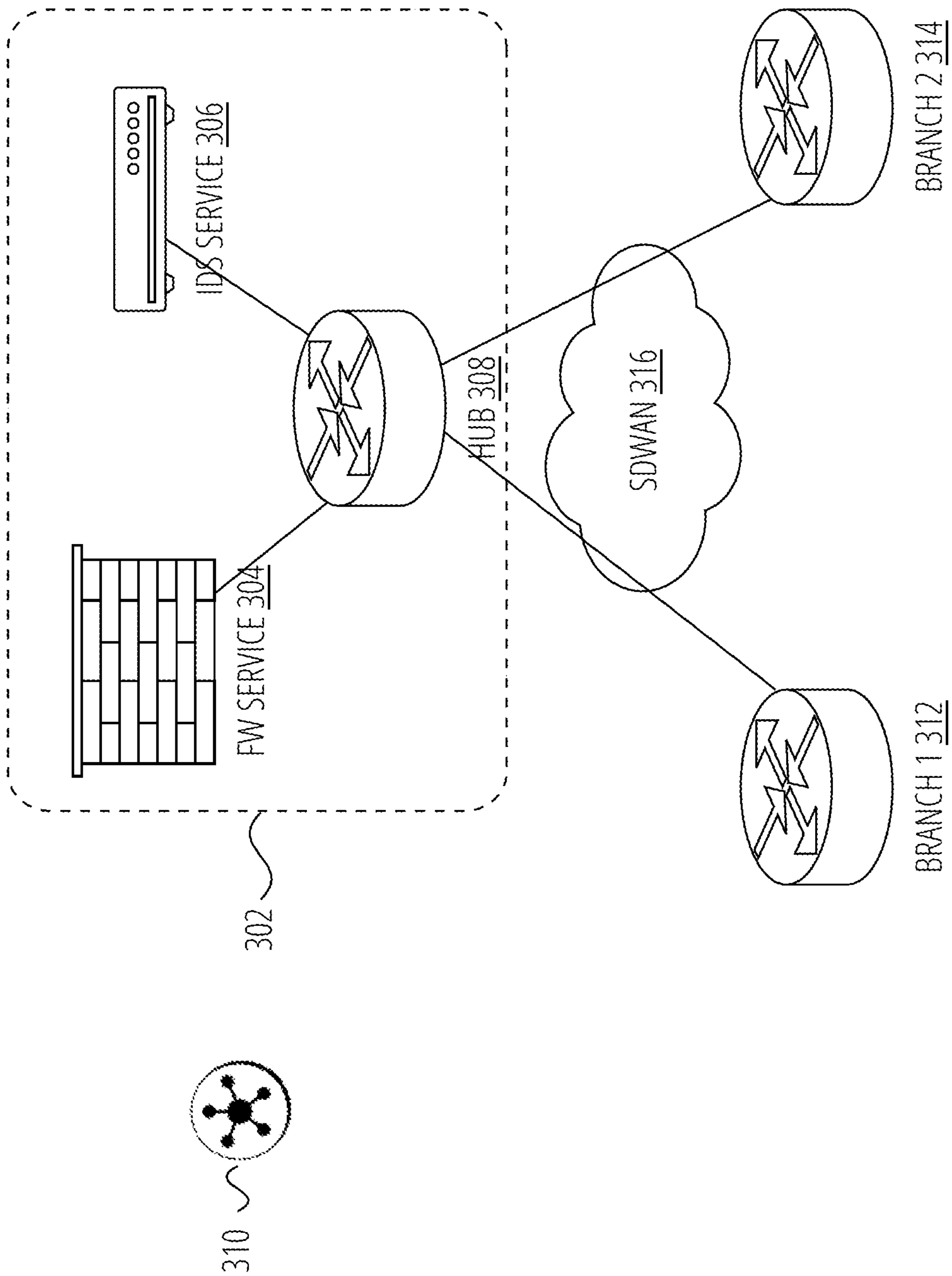
FIG. 3 illustrates an example service fabric workflow for applying service chains to network traffic in an enterprise network, according to some aspects of the present disclosure.

FIG. 3 illustrates an example service fabric workflow for applying service chains to network traffic in an enterprise network, according to some aspects of the present disclosure. As Initially, an intended SC may be expressed by a user (e.g., Apply Firewall Service and Intrusion Detection System (IDS) Service to Network Traffic from Branch 1 to Branch 2).

Based on this intent-based SC, within SC-Hub 302, FW Service 304 and IDS Services 306 may be deployed. SC-Hub 302 can be an on-premise site, a cloud based site (e.g., on Amazon Web Services, a Software Defined Cloud Interconnect (SDCI) site, etc.). In this instance, an SC is defined with FW Service 304 and IDS Service 306 as the underlying services.

SC-Hub 302 may have a Hub 308 (may also be referred to as cEdge) acting as a gateway/switch. SC-Hub 302 may have more than one Hub 308. The SC (consisting of FW Service 304 and IDS Service 306) may be configured on Hub 308 and then advertised to vSmart 310 (vSmart 310 may be any one of network appliances described with reference to FIG. 1 including, but not limited to, one or more of control plane network appliances 132).

Next, SC may be advertised by vSmart 310 to Branch 1 312. In response, network traffic originating from Branch 1 312 and destined for Branch 2 314 may be steered towards SC-Hub 302, where FW Service 304 and IDS Service 306 may be applied to (executed on) data packets (network traffic) from Branch 1 312. Thereafter, data packets to which FW Service 304 and IDS Service 306 are applied, are forwarded to Branch 2 314.

In example of FIG. 3, FW Service 304 and IDS Service 306 are two abstract service-types grouped and sequenced into an abstract SC-type. A service-type may selected from a group of defined service types (e.g., FW service, IDS service, Flow Analyzer service, WAN optimizer service, etc.). Similarly an SC-type may be selected from a defined namespace (e.g., an SC consisting of FW Service 304 and IDS Service 306 may be given SC-type SC1). Analogous to an IP address, the group of service types and/or SC types may be expanded with existing services and/or SCs modified or deleted. In example of FIG. 3, SC1 is reachable from SC-HUB 302 and hence may be advertised as SC1 just like an IP address. As noted, traffic from Branch 1 312 destined for Branch2 that need to be service chained by SC1 will automatically be steered to SC-HUB 302 (e.g., over SDWAN 316, which can be the same as example network 100 of FIG. 1) if it is specified in a traffic policy such as example traffic policy below:

Traffic Steering Policy Format
  match <criteria1>
  action accept
  set service-chain SC1

An example template for defining an SC may be as follows:

| SC_template |
|---|
| service-chain < ><br>service-chain-vrf < ><br>service-chain-description < ><br>service < > sequence < ><br>service < > sequence < > |

In some examples, a service chain may be defined wherein, each service has a hierarchical single construct that embeds all routing requirements for the relevant service in the service chain. Example embodiments of a single construct for a service are described in U.S. application Ser. No. 18/348,065, filed on Jul. 6, 2023, the entire content of which is incorporated herein by reference.

Using the above template for defining a SC, the following SC for the example of FIG. 3 maybe defined:

service-chain SC1
  service-chain-vrf 10
  service-chain-description SC1_*t*
  service FW Service sequence 100
  service IDS Service sequence 200.

Figure 4:
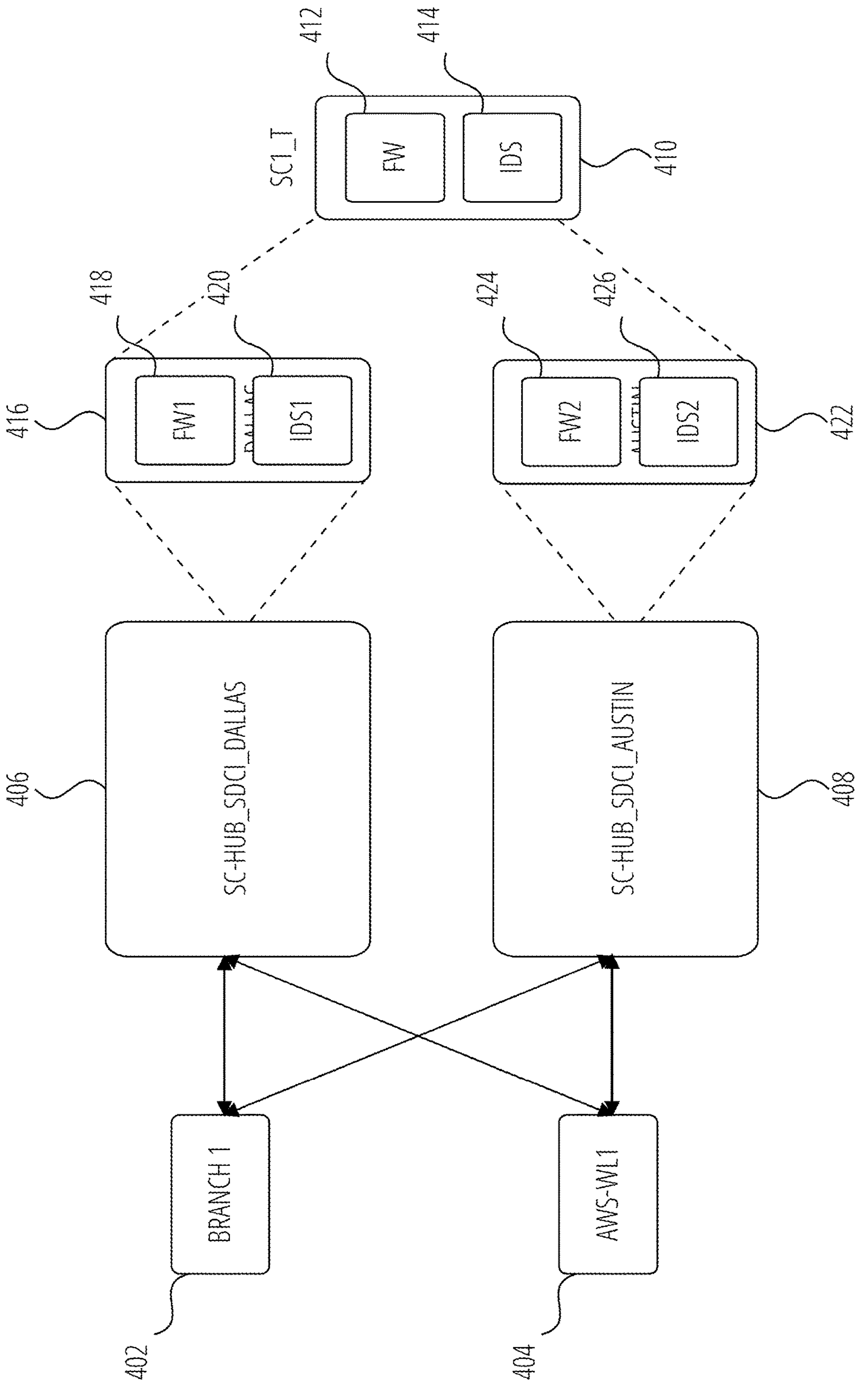
FIG. 4 visually illustrates an example of routable and intent-based service chains applied to network traffic, according to some aspects of the present disclosure.

FIG. 4 visually illustrates an example of routable and intent-based service chains applied to network traffic, according to some aspects of the present disclosure. Initially, the system (e.g., via vSmart 310), may receive an intent-based description of one or more services to be applied to a particular type of traffic. An example of such intent-based description can be—"Apply Firewall & Intrusion Detection System to all traffic to and from enterprise workloads in AWS. For branches in Texas, these workloads are reachable through hub sites in Dallas & Austin," where AWS stands for Amazon Web Services.

In example of FIG. 4, Branch 1 402 may be in Texas and AWS-WL1 404 may be a cloud-based workload with address IP1. Branch 1 402 may be connected to AWS via a middle-mile sites (e.g., provided by an SDCI provider). Examples of such middle-mile sites include SC-HUB_SDCI_DALLAS 406 and SC-HUB_SDCI_AUSTIN 408. Gateways may be available in both Dallas and Austin. AWS-WL1 404 may be reachable from both Dallas and Austin SDCI sites (e.g., SC-HUB_SDCI_DALLAS 406 and SC-HUB_SDCI_AUSTIN 408).

An SC-type for the intent-based description above may be created (SC1_*t* 410). SC1_*t* 410 may include a Firewall Service (FW 412) and an IDS service (IDS 414) may be instantiated in both Dallas and Austin.

During instantiation, service instances FW1 418 and FW2 424 (of abstract type FW) as well as service instances IDS1 420 and IDS2 426 (of abstract type IDS) are brought up at SC-HUB_SDCI_DALLAS 406 and SC-HUB_SDCI_AUSTIN 408 as shown in FIG. 4. FW1 418 and IDS1 420 are shown as part of one instance at Dallas (e.g., SC1-Dallas 416) while FW2 424 and IDS2 426 are shown as part of another instance at Austin (e.g., SC1-Austin 422).

In one example, a service instance may be brought up in a specified location for specified provider(s) and/or vendor account(s), while in other examples, a service instance bring-up does not happen as part of instantiation. In examples, where service instance bring-up does not happen as part the instantiation, all that is used to route network traffic to a service is the IP of the service instance and a route towards the service instance.

Furthermore, during instantiation, networking parameters toward the service instances (e.g., SC1-Dallas 416 and SC1-Austin 422) are specified in the service instances. In one example, only the networking is specified inside the instance and hence, the services can be in any location (e.g., in SC-HUB_SDCI_DALLAS 406, SC-HUB_SDCI_AUSTIN 408, in another SDCI, cloud networks VPC/VNETs, on-premise network component, etc.). An example configuration of a SC1_*t* 410 may be downloaded by vSmart 310 (or alternatively by a vManage or any other network control appliances) to SC-HUB_SDCI_DALLAS 406 and SC-HUB_SDCI_AUSTIN 408:

service-chain SC1
  service-chain-vrf 10
  service-chain-description SC1_*t*
  service FW sequence 100
  service IDS sequence 200

With networking parameters specified and SC1-Dallas 416 and SC1-Austin 422 downloaded at SC-HUB_SDCI_DALLAS 406 and SC-HUB_SDCI_AUSTIN 408, respectively, as described above, SC1_*t* 410 may be advertised by SC-HUB_SDCI_DALLAS 406 and SC-HUB_SDCI_AUSTIN 408 through OMP to vSmart 310.

In one example, a centralized data policy can be specified in vSmart 310 for steering network traffic. In other example embodiments any known or to be developed control policy, as desired, and/or localized policy may be used. Once an appropriate policy is applied, vSmart 310 may resolve the policy action such that traffic from Branch 1s 402 to AWS-WL1 404 are routed through Dallas & Austin. In one example, the routing through Dallas and Austin (e.g., SC-HUB_SDCI_DALLAS 406 and SC-HUB_SDCI_AUSTIN 408 may be performed based on Equal Cost Multi-Path (ECMP) routing.

Finally, a traffic steering policy may be created and placed anywhere in the network such that any data packet/network traffic to which SC1 is applicable, is routed towards the SC (e.g., one of SC1-Dallas 416 at SC-HUB_SDCI_DALLAS 406 or SC1-Austin 422 at SC-HUB_SDCI_AUSTIN 408). An example traffic steering policy may be as shown below in relation to non-limiting example of FIG. 4:

```
policy
  data-policy DP__BRANCH__TO__AWS
  vpn-list VPN__ALL
    sequence 10
    match destination-prefix-list PFX__LIST__AWS__WL1__IP1
    !
    action accept
      set service-chain SC1
```

-continued

```
        !
        default-action drop
    apply-policy
        site-list SITE__Branch1
            data-policy DP__BRANCH__TO__AWS from-service.
```

Figure 5:
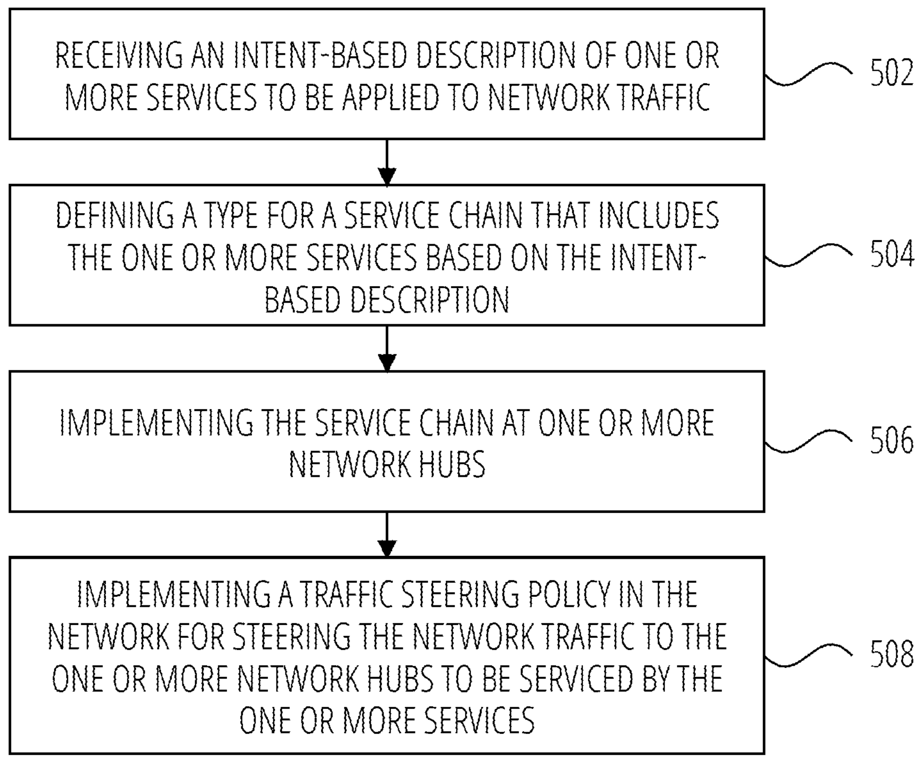
FIG. 5 illustrates an example process for steering network traffic to routable and intent-based service chains according to some aspects of the present disclosure.

FIG. 5 illustrates an example process for steering network traffic to routable and intent-based service chains according to some aspects of the present disclosure. The process of FIG. 5 will be described from the perspective of a network controller appliance such as network controller appliance 132, which as described above can be a vSmart, a vManage, etc. However, example embodiments are limited thereto, and the same process can be performed by any other network appliance (e.g., network management appliance 122, etc.) Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving an intent-based description of one or more services to be applied to network traffic at block 502. In some examples, such intent-based description can identify the desired services along with one or more network hubs and network traffic origin and destination. the one or more services include at least one of a firewall service, an intrusion detection system service, and a flow analyzer service, etc., as described above. In some examples, the one or more network hubs may not be specified but may then be determined by network controller appliance 132 based on various network and load balancing conditions (e.g., in proximity of network traffic origin and/or destination).

According to some examples, the method includes defining a type for a service chain that includes the one or more services based on the intent-based description at block 504. In some examples, network controller appliance 132 may determine the desired services expressed in the intent-based description by analyzing the intent-based description using any known or to be developed language processing models. In some examples, intent-based description may be provided via voice command. Accordingly, processing thereof may be performed using any known or to be developed speech processing techniques.

In some examples, a determined type may be as described above (e.g., SC1_*t* 410). The type may service as an address (analogous to an IP address) for the service chain thereby making the service chain easily routable for routing the network traffic to and from the one or more service included in the service chain. As noted above, a type for a service chain may be selected from a group of defined service chain types.

According to some examples, the method includes implementing the service chain at one or more network hubs at block 506. In some examples, implementing the service chain at one or more network hubs includes instantiating the service chain at each of the one or more network hubs (e.g., as described above with reference to FIGS. 3 and 4). In some examples, instantiating the service chain includes generating a configuration for the service chain and downloading the configuration at each of the one or more network hubs. This may be performed as described above with reference to FIG. 4.

The service chain can be implemented at least two network hubs (e.g., SC-HUB_SDCI_DALLAS 406 and SC-HUB_SDCI_AUSTIN 408). Therefore, the network traffic can be steered to any one of the two network hubs based on Equal Cost Multi-Path (ECMP) routing.

According to some examples, the method further includes implementing a traffic steering policy in the network for steering the network traffic to the one or more network hubs to be serviced by the one or more services at block 508. In some examples, network controller appliance 132 may implement the traffic steering policy by generating the traffic steering policy and sending the traffic steering policy to one or more network routers (and/or any other component in network 100 through which data packets associated with the network traffic may traverse) for steering the network traffic (1) to the one or more network hubs (to be serviced by the one or more services) and (2) to one or more intended destination after the network traffic is serviced by the one or more services.

Figure 6:
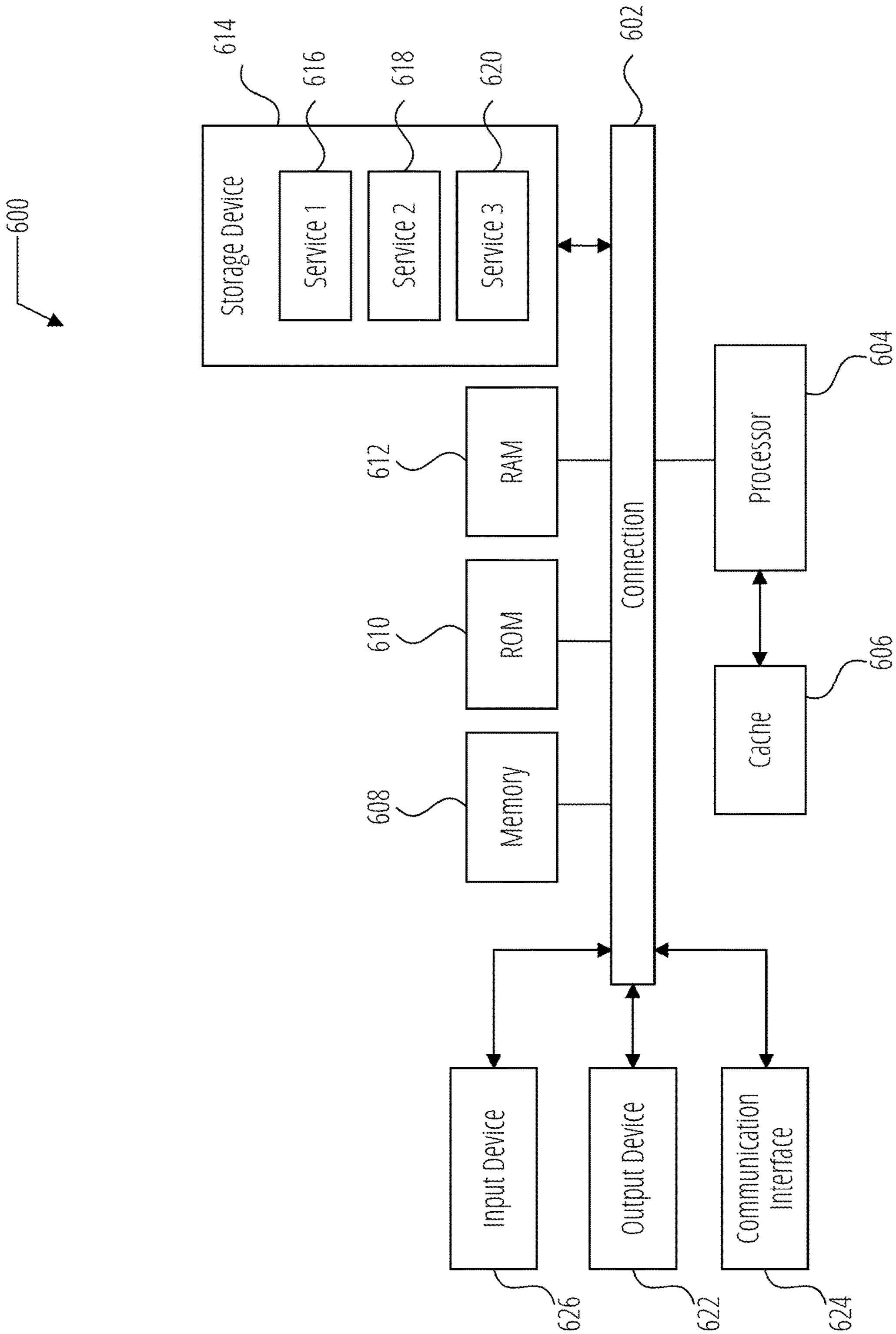
FIG. 6 shows an example of a computing system, according to some aspects of the present disclosure.

FIG. 6 shows an example of a computing system, according to some aspects of the present disclosure. Computing system 600 can be for example any computing device making up network 100 such as network controller appliances 132, network management appliances 122, and/or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method for simplifying steering of network traffic, the method comprising:

receiving an intent-based description of one or more services to be applied to the network traffic;

applying a language processing model to the intent-based description to define a type for a service chain that includes an identification of the service chain, a virtual routing and forwarding identification of the service chain, and a respective identification of each of the one or more services based on the intent-based description;

routing the network traffic to and from the one or more service included in the service chain using the type as an address of the service chain;

implementing the service chain at one or more network hubs;

generating a traffic steering policy in the network for steering the network traffic to the one or more network hubs to be serviced by the one or more services; and sending the traffic steering policy to one or more network routers for steering the network traffic (1) to the one or more network hubs; and (2) to one or more intended destination after the network traffic is serviced by the one or more services.

2. The method of claim 1, wherein the type is selected from a group of service chain types.

3. The method of claim 1, wherein the intent-based description identifies the one or more network hubs, and implementing the service chain includes instantiating the service chain at each of the one or more network hubs.

4. The method of claim 3, wherein instantiating the service chain comprises:

generating a configuration for the service chain; and downloading the configuration at each of the one or more network hubs.

5. The method of claim 1, wherein the service chain is implemented at least two network hubs, and the network traffic is steered to one of the two network hubs based on Equal Cost Multi-Path (ECMP) routing.

6. The method of claim 1, wherein the one or more services include at least one of a firewall service, an intrusion detection system service, and a flow analyzer service.

7. A network controller comprising:

one or more memories having computer-readable instructions stored therein; and one or more processors configured to execute the computer-readable instructions to:

receive an intent-based description of one or more services to be applied to network traffic;

applying a language processing model to the intent-based description to define a type for a service chain that includes an identification of the service chain, a virtual routing and forwarding identification of the service chain, and a respective identification of each of the one or more services based on the intent-based description;

route the network traffic to and from the one or more service included in the service chain using the type as an address of the service chain;

implement the service chain at one or more network hubs; and generate a traffic steering policy in the network for steering the network traffic to the one or more network hubs to be serviced by the one or more services; and send the traffic steering policy to one or more network routers for steering the network traffic (1) to the one or more network hubs; and (2) to one or more intended destination after the network traffic is serviced by the one or more services.

8. The network controller of claim 7, wherein the type is selected from a group of service chain types.

9. The network controller of claim 7, wherein the intent-based description identifies the one or more network hubs, and the network controller is configured to implement the service chain by instantiating the service chain at each of the one or more network hubs.

10. The network controller of claim 9, wherein the network controller is configured to instantiate the service chain by:

generating a configuration for the service chain; and downloading the configuration at each of the one or more network hubs.

11. The network controller of claim 7, wherein the service chain is implemented at least two network hubs, and the network traffic is steered to one of the two network hubs based on Equal Cost Multi-Path (ECMP) routing.

12. The network controller of claim 7, wherein the one or more services include at least one of a firewall service, an intrusion detection system service, and a flow analyzer service.

13. One or more non-transitory computer-readable media comprising computer-readable instructions, which when executed by one or more processors of a network controller, cause the network controller to:

receive an intent-based description of one or more services to be applied to network traffic;

apply a language processing model to the intent-based description to define a type for a service chain that includes an identification of the service chain, a virtual routing and forwarding identification of the service chain, and a respective identification of each of the one or more services based on the intent-based description;

route the network traffic to and from the one or more service included in the service chain using the type as an address of the service chain;

implement the service chain at one or more network hubs;

generate a traffic steering policy in the network for steering the network traffic to the one or more network hubs to be serviced by the one or more services; and send the traffic steering policy to one or more network routers for steering the network traffic (1) to the one or more network hubs; and (2) to one or more intended destination after the network traffic is serviced by the one or more services.

14. The one or more non-transitory computer-readable media of claim 13, wherein the intent-based description identifies the one or more network hubs, and the execution of the computer-readable instructions cause the network controller to implement the service chain by instantiating the service chain at each of the one or more network hubs.

15. The one or more non-transitory computer-readable media of claim 14, wherein the execution of the computer-readable instructions cause the network controller to instantiate the service chain by:

generating a configuration for the service chain; and downloading the configuration at each of the one or more network hubs.

16. The one or more non-transitory computer-readable media of claim 13, wherein the service chain is implemented at least two network hubs, and the network traffic is steered to one of the two network hubs based on Equal Cost Multi-Path (ECMP) routing.

17. The one or more non-transitory computer-readable media of claim 13, wherein the one or more services include at least one of a firewall service, an intrusion detection system service, and a flow analyzer service.

* * * * *